United States Patent [19]

Mumford

[11] Patent Number: 4,499,806
[45] Date of Patent: Feb. 19, 1985

[54] MULTIPLE GOB SHEARING MECHANISM OPERATING IN A STRAIGHT LINE

[75] Inventor: Eustace H. Mumford, Ottawa Lake, Mich.

[73] Assignee: Owens-Illinois, Inc., Toledo, Ohio

[21] Appl. No.: 541,815

[22] Filed: Oct. 13, 1983

[51] Int. Cl.³ .............................................. C03B 5/38
[52] U.S. Cl. ........................................ 83/527; 83/563; 83/564; 83/623; 83/641; 83/58; 83/DIG. 1; 65/334
[58] Field of Search ................ 83/527, 623, 640, 641, 83/700, 563, 564, 58, DIG. 1; 65/133, 332, 334

[56] References Cited

U.S. PATENT DOCUMENTS 3,592,938  7/1971  Bracken et al. .................. 65/133 X
4,174,647 11/1979  Dahms .............................. 83/522 X Primary Examiner—James M. Meister
Attorney, Agent, or Firm—Gerald T. Welch; Myron E. Click

[57] ABSTRACT

A multiple gob glass shearing mechanism in which the sets of opposed shear blades are supported for movement toward and away from each other in a straight line or with parallel motion. One set of shears is mounted on a shear guide that can be adjusted up or down relative to the holder of the opposed set of shears. This adjustment is for the purpose of adjusting the tension on all the sets of blades simultaneously and can be affected when the shears are in operation. The drive for the shears may be unlatched for safety purposes when out of position and when put back into operation the shear blades will not close unless the latch is refastened.

13 Claims, 10 Drawing Figures

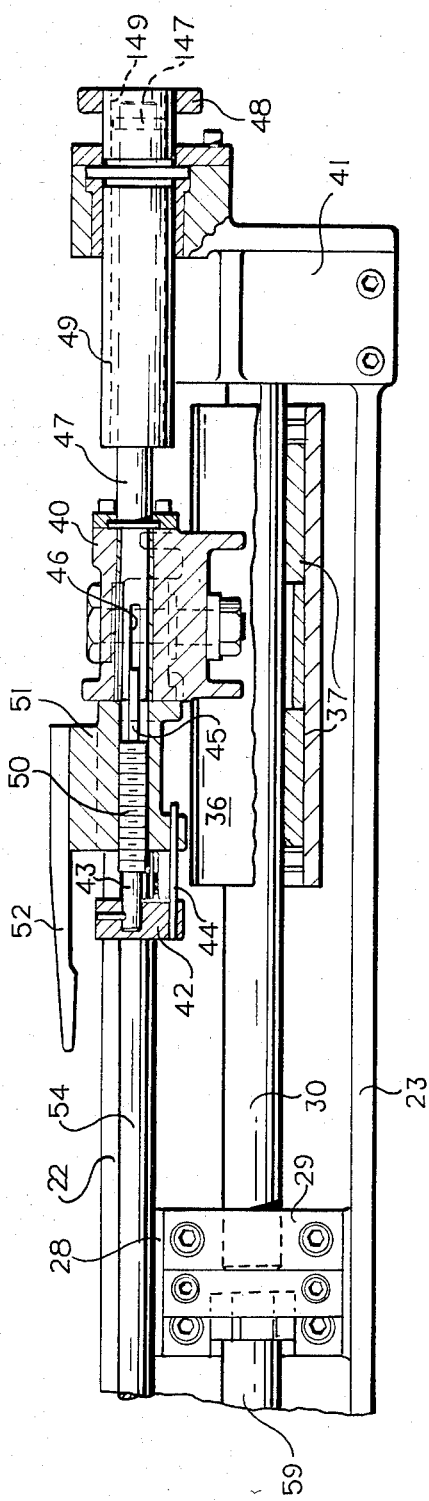
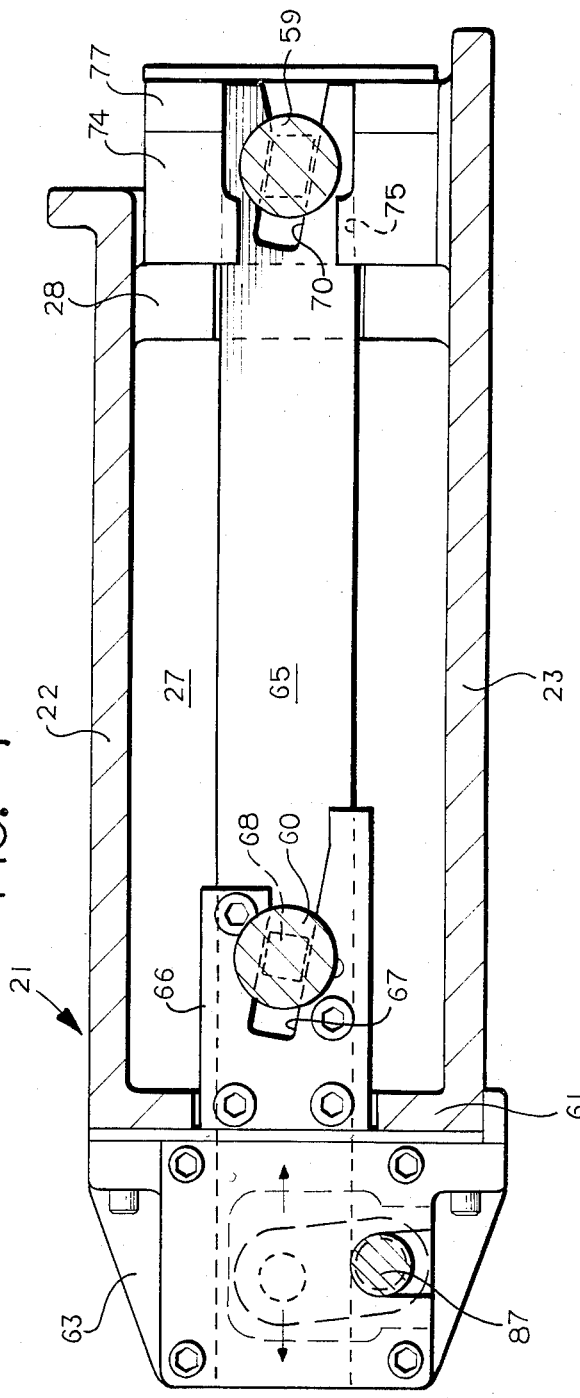
FIG. 4
FIG. 5

MULTIPLE GOB SHEARING MECHANISM OPERATING IN A STRAIGHT LINE

BACKGROUND OF THE INVENTION

It is the practice to feed gobs of molten glass to glass forming machine sections at a rate of 10 to 20 gobs per minute for each mold cavity, depending upon the weight of the gob. These gobs are formed by the shearing of a stream of glass issuing from the bottom of a forehearth. The shearing mechanism used in these operations has been the scissor type which swings generally about a pivot point adjacent one side of the end of the feeder, or what is more commonly termed "feeder bowl". The two blade carrying arms operate much as the blades of a scissors, to bring the two shear blades into overlapping relationship on the axis of the stream of glass. With the advent of more productive machines, which will handle four or more gobs of glass simultaneously, there has become a necessity for feeder mechanisms which can consistently shear four or more streams of glass into gobs simultaneously at a controlled repetitive rate. Feeding the higher productivity glass forming machine, and in particular glass bottle forming machines having quadruple cavities per section and as many as 10 side-by-side sections, has become a reality.

By way of background, several recent patents have issued on straight line glass stream cutting apparatus. One U.S. Patent is U.S. Pat. No. 3,592,938, issued July 13, 1971 to R. S. Bracket et al. In this patent, the two shear blade holders are moved toward and away from each other by an interconnecting rack and pinion arrangement with a drive lever or link coming from the normal rotating shear drive cam which oscillates a lever, which in turn is coupled to one of the shear arm holders. This shear arm holder carries a rack which drives through a pinion to a second rack carried by an opposite or opposing shear blade holder, and oscillation of the drive rod will cause the shear blades to move toward and away from each other along essentially a straight line, since both blade holders are mounted for movement along horizontal rods positioned at one side of the area of the feeder bowl axis.

A second U.S. Pat. No. 4,174,647, issued Nov. 20, 1979 in the name of Dahms, and the several divisions thereof, also disclose a straight line shear mechanism. In this particular patent, there is shown in FIG. 1 a shear mechanism comprising a generally horizontal frame, which includes end plates that are interconnected by side rails. The side rails, along with supporting rods for the shear blade holders, constitute a rectangular frame which surrounds the axis of the streams of molten glass that would issue from the feeder. This frame is mounted to a post which, as stated in the patent, is mounted to a feeder bowl by any suitable means. The particular shear mechanism described in this patent is air operated in that it has an air motor which is used to provide the driving force for the shear blades as they reciprocate toward and away from each other while guided by the side rails. In addition, this patent shows drop guides which are adjustable relative to their mounting and the blade carrying mechanism.

In addition to the foregoing patent, a copending application, Ser. No. 398,122, filed July 14, 1982, now U.S. Pat. No. 4,450,741 of common assignee, discloses a straight line glass shearing apparatus which has some similarities to the present invention. The above-noted copending application provides a straight line gob shearing mechanism with drop guides that travel with the shears and engage adjustable stops. The adjustment of the drop guide stops may be made while the mechanism is in operation. In addition, the tension on the blades may be adjusted with respect to any individual pair when the mechanism is out of operation. Furthermore, the height of the shears, and therefore the horizontal shearing plane, can be adjusted by the fact that the entire shearing mechanism is mounted to the feeder bowl by a vertically adjustable post.

With the foregoing in mind, it is an object of this invention to provide apparatus which will move the shear blades into and out of engagement with the stream of glass to form gobs wherein the shear blades move in straight paths, relative to each other, both toward and away from each other. By providing the parallel operating shear arm mechanism, it is believed that a superior and better control of the shear operation can be obtained. One of the drawbacks with respect to the shearing of multiple gobs with arms which operate, in effect from adjacent pivot axes at one side or the other of the feeder bowl, is that the multiple shear blades are moving through plural arcs rather than moving in a straight path across the stream of glass. With the shears moving through different arcs, it is even more difficult sometimes to accurately control the degree of overlap of the shears, and by reason of the outer shears moving at a slightly greater velocity than the shears more closely positioned relative to the pivot points, there is a tendency for the shear mechamism to inconsistently cut all of the multiple gobs at the same weight. To be able to provide the gobs to the forming machine, such that they are all of the same and consistently equal weights through an extended period of plural gob feeding, is a major goal of the present invention.

An additional object of the present invention is to provide a mechanism in which the shear blade mounting mechanism is supported such that it may be swung away from the area of the feeder for repairs or to provide access to the bottom of the feeder without disturbing the linkage to the shear drive cam.

It is a further object of the present invention to provide a mechanism which is movable out of the shear area without interfering with or requiring the specific interruption of the glass streams, if desired.

It is an additional object of this invention to provide a drop guide mechanism which moves with the upper shear blades and to provide a mechanism for adjusting the position of the drop guide to a precise location while in operation and without the requirement of a complicated mechanical system which would be subject to excessive wear.

It is a still further object of the present invention to provide a glass gob shearing mechanism which will simultaneously cut four gobs at a single stroke, with the lower set of shear blades being vertically adjustable, as a unit, to permit adjustment of shear tension while the mechanism is in operation.

SUMMARY OF THE INVENTION

Apparatus for shearing multiple streams of molten glass into gobs which are issuing from a plural orifice feeder bowl in which the sets of opposed shear blades are mounted on reciprocable slides that move toward and away from each other on a linear path. The movement of the slides toward and away from each other is affected by the oscillation of a crank sleeve having radially extending arms, one of which is connected to each of the slides so as to move them toward and away from each other in response to the rotation of the sleeve, which in turn is mounted for oscillation about a vertical axis. Drop guides, which are carried by the upper shear mechanism, are adjustable on the fly so as to affect the arresting movement of the gobs at a preselected position during the operation of the shear mechanism. The tension on the shears is adjustable by the manner of mounting the lower set of shears on vertically adjustable, horizontal guides that can be adjusted while the shears are in operation.

BRIEF DESCRIPTION OF THE DRAWINGS

FIG. 4 is a cross-sectional view, on an enlarged scale, taken at line 4—4 of FIG. 1;

FIG. 5 is a cross-sectional view taken at line 5—5 of FIG. 1, on an enlarged scale;

DETAILED DESCRIPTION OF THE DRAWINGS

Figure 1:
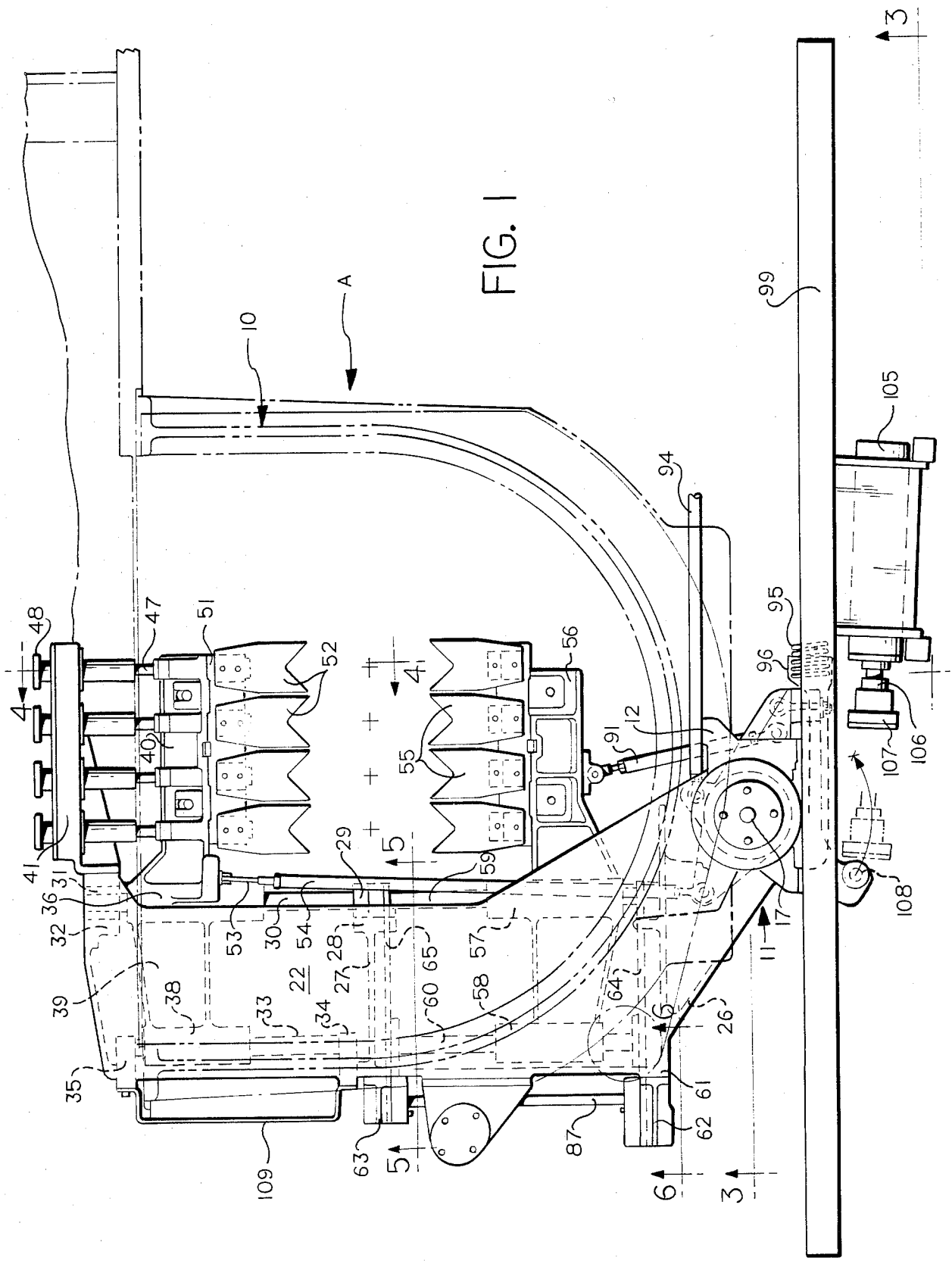
FIG. 1 is a top plan view of the shear mechanism of the invention.
Figure 2:
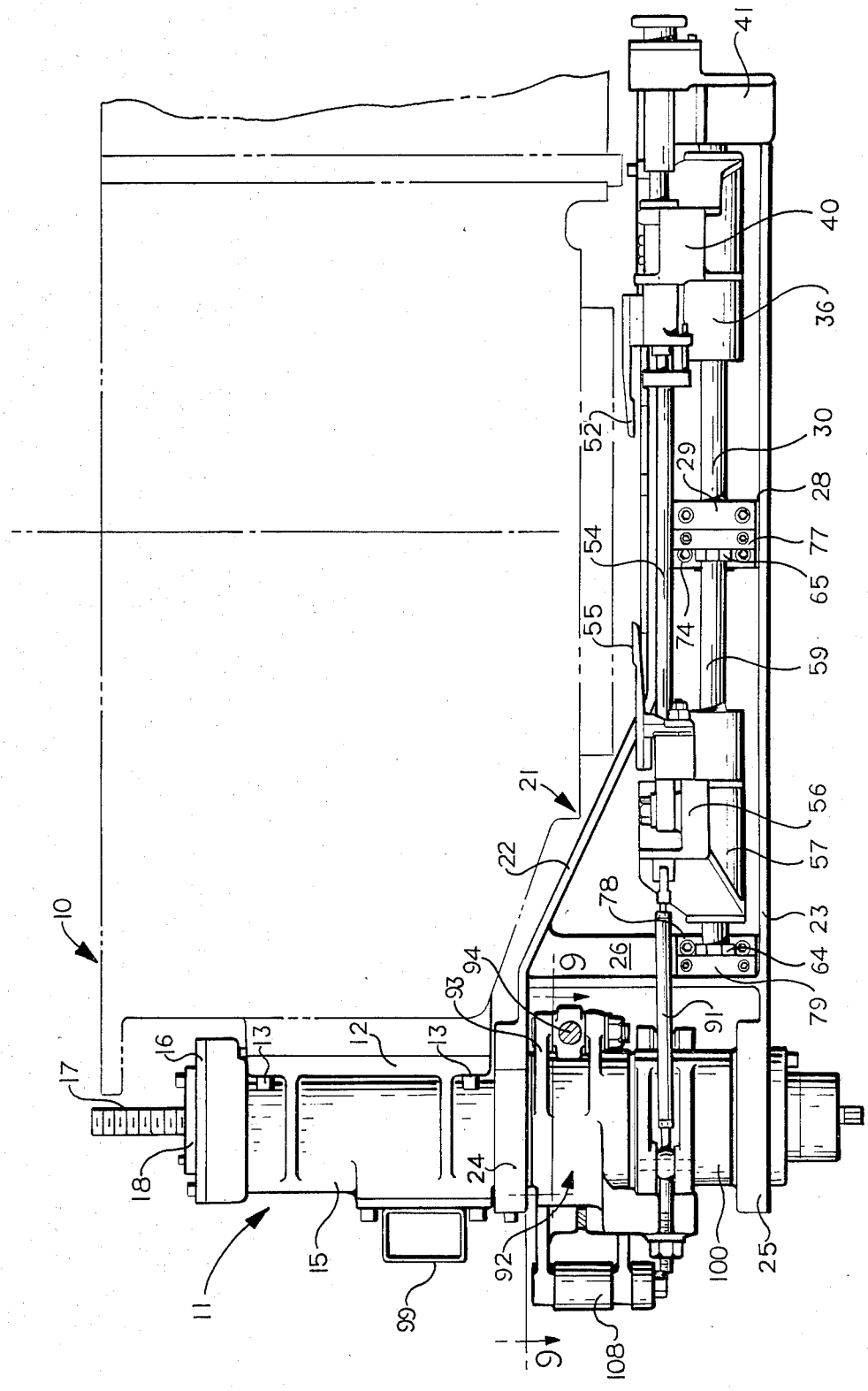
FIG. 2 is a side elevational view in the direction of arrow A, on an enlarged scale, of the mechanism of FIG. 1.
Figure 3:
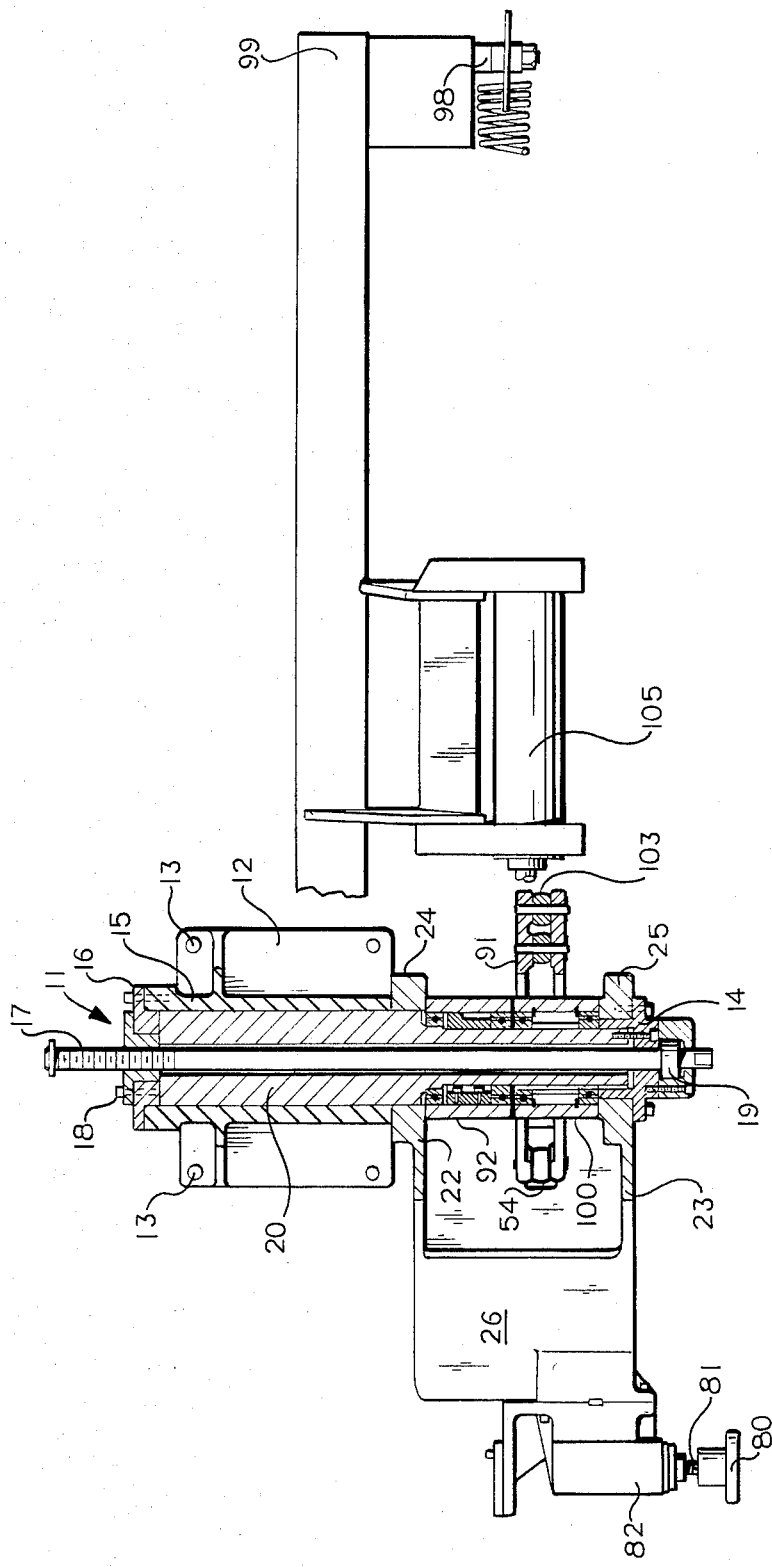
FIG. 3 is a cross-sectional view taken at line 3—3 of FIG. 1, without the feeder bowl being shown.

With particular reference to FIGS. 1 and 2, the present invention will be described in detail. A feeder bowl generally designated 10, shown in phantom line in FIGS. 1 and 2, takes the general shape of a horseshoe opening at the top. This bowl 10 is normally made of heat resistant metal such as iron or steel. To the forward end, or to the left as viewed in FIG. 2, the feeder bowl is mounted to a shear mechanism mounting member generally designated 11. Shear mount 11 comprises a casting 12 having a horizontally extending face which is bolted to the side of the feeder bowl 10 by bolts 13. The casting 12, shown in FIGS. 2 and 3, extends along one side of the feeder bowl and is formed with a vertical mounting tube portion generally designated 15. The tube 15 is provided with a cover 16 through which a vertical adjusting screw 17 extends. The adjusting screw 17 is provided with a threaded washer 18, which sets within a recess formed in the cover 16. The lower end of the screw 17 carries a radially extending collar 19 on which a lower, annular flange plate 14 rests. A main mounting shaft 20 extends within the tube 15. The shaft 20 extends downwardly through and extends below the tube 15, and at its lower end is connected to the radial flange 14. The shaft 20 carries, at spaced-apart intervals thereof, a pair of outwardly extending supporting arms 22 and 23. The upper supporting arm 22 extends downwardly at an angle and serves, as will later be described, as a main frame member for the shear mechanism. It should be understood that the arms 22 and 23 are provided with annular members 24 and 25 respectively, which surround the shaft 20. In the space between the members 24 and 25 on the shaft 20, there are provided a pair of shear operating links, which are shown in detail in FIGS. 9 and 10. One of the links serves to operate both of the shear supporting structures of the invention. The upper casting 22, as shown in FIG. 1 to the left, forms a generally flat horizontal surface which spans the length of the bowl 10. The lower casting 23 also is coextensive in configuration to that of the casting 22. It should be pointed out that several webs, such as the web 26, span the space between the two castings 22 and 23. Another support web 27 is shown in dotted line in FIG. 1 and shown in FIG. 5 as extending from the forward edge of the upper casting 22 to the rear wall portion thereof and vertically spanning the gap with the lower casting 23. The web 27 at its forward end, or to the right as viewed in FIGS. 1 and 5, presents an enlarged mounting boss 28. In actual fact, the two supporting arms 22 and 23 are of a single casting integral with the annular members 24 and 25, which embrace the vertical mounting shaft 20. All of this mechanism, in effect, may be termed "a carriage 21 for the shear mechanism".

A bearing block 29 is bolted to the face of the boss 28 and serves to support the left end of a shaft 30, as viewed in FIGS. 2 and 4. The other end of the shaft 30 is supported in a bearing block 31 (See FIG. 1). The bearing block 31 is carried in a forward portion 32 of the carriage 21 casting, of which arms 22 and 23 form a part. Parallel to the shaft 30 and positioned to the left thereof as viewed in FIG. 1 is a second shaft 33. The shaft 33 is supported at its ends by a pair of shaft support members 34 and 35. As best seen in FIG. 4, the shaft 30 supports a front slide 36. The slide 36 is in the form of a generally horizontal cylinder containing sets of bushings 37. A rear slide 38, as shown in FIG. 1, is of similar construction to the slide 36 and is supported integral therewith by a joining web 39. Extending forwardly from the slide 36 is a multiple shear blade supporting arm 40. As viewed in FIG. 2, it can be seen that the right hand shear support arm 40 may move to the left guided by the two shafts 30 and 33. The portion of the casting 32, which supports the bearing block 31, also supports an outwardly extending arm 41. The arm 41 supports four stationary drop guide adjusting members, one of which is shown in section in FIG. 4.

In the operation of glass cutting shears, it is necessary that the underlying cutting shear be opposed by what is termed a drop guide carried by the overlying shear blades and, in the present case, a drop guide 42, in the form of a generally rectangular block, is centrally supported by a horizontal shaft 43. The drop guide and shaft 43 are relatively rotatable; however, a pin 44 extends from the back of the drop guide to the rear through a horizontal hole formed in the support arm 41. The shaft 43, at its right hand end, is formed with a flat, horizontally extending, blade-like portion 45. This blade-like portion 45 extends into a complementary slot 46 formed in the end portion of a horizontal shaft 47. The shaft 47, as shown in FIGS. 1 and 4, is rotatable by a hand rotatable knob 48 fixed to a cylindrical guide 49. The shaft 47 is supported for rotation and reciprocated along its horizontal axis in the cylindrical guide 49 or, as it might be termed, an adjusting sleeve. The shaft 47 carries a vertical pin 147 that rides in horizontal slots 149 which extend the length of the guide 49. Thus, rotation of the guide 49 will rotate shaft 47. The shaft 43 is threaded at 50 into a hollow horizontal threaded opening in a blade supporting boss 51. The individual upper shear blades 52 are supported by the blade holder or boss 51.

While the foregoing description has been principally directed to the shear blade and its mounting as shown in FIG. 4, it should be understood that all of the blades and the drop guides, of which there is one for each set of shear blades, is adjustable in the same manner as described above. Rotation of the knob 48 will turn the guide 49, which then will rotate the shaft 47 and the blade 45 connected to the shaft 43. In this way, the shaft 43 will be rotated either to advance the drop guide 42 to the left or to the right, depending on the direction of rotation, and thus the drop guide 42 may be placed in a precise location. Inasmuch as this connection between the stationary adjusting knob and shaft 47 is stationary and the drop guide is moving with the shear mechanism, the drop guide may be adjusted even during the time that the shear mechanism is in operation. This of course has its obvious advantages, permitting the operator to make such adjustment while observing the results of the adjustment in the movement of the gobs as they are severed from the streams of molten glass. Each of the drop guides, of which there are four, may be adjusted individually independent of the other three.

As viewed in FIG. 1, the shear support arm 40 adjacent the front slide 36 is connected by a flexible connector 53 to an elongated rod 54. The rod 54 is longitudinally reciprocated by a drive mechanism to be described in detail later. It can thus be seen that the shear blades 52 are movable in unison toward and away from the opposing shear blades by movement of the arm 40 on the stationary guide shafts 30 and 33. In opposition to the shear blades 52 are a set of bottom shear blades 55. Each of the individual shear blades 55 is capable of vertical adjustment relative to the arm to which they are connected, and this particular manner of adjusting shear blades is shown and described in detail in copending application Ser. No. 398,122, now U.S. Pat. No. 4,450,741. Suffice it to say that each of the blades 55 is mounted on a common arm 56. The arm 56, similar to the arm 40, is formed with a pair of generally parallel slides 57 and 58. The front slide 57 is guided by a front shaft 59, while the rear slide 58 is guided on a shaft 60. The shafts 59 and 60 are parallel to each other and have their horizontal axes in the same horizontal plane.

Figure 8:
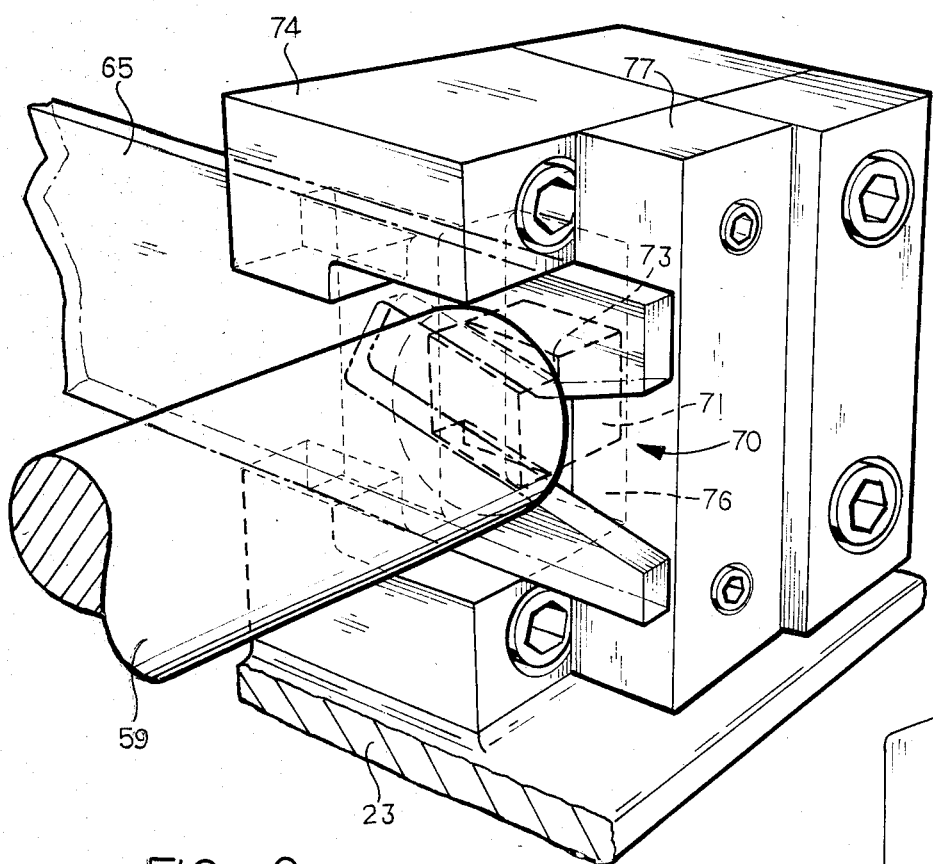
FIG. 8 is a greatly enlarged perspective view of the right hand end supporting structure of FIG. 7, in assembled form.
Figure 6:
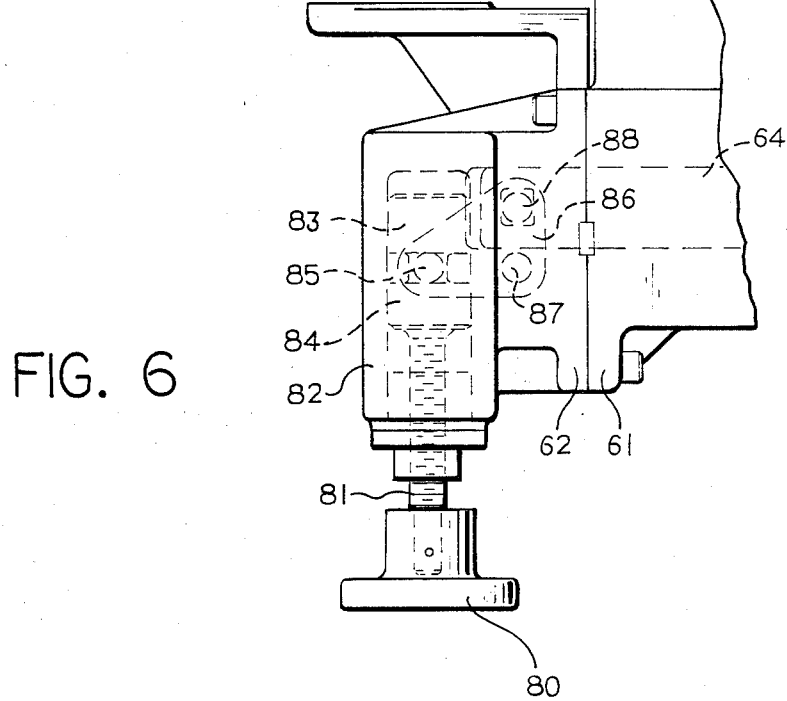
FIG. 6 is a partial, side elevational view of an adjusting device, on an enlarged scale, taken at line 6—6 of FIG. 1.
Figure 7:
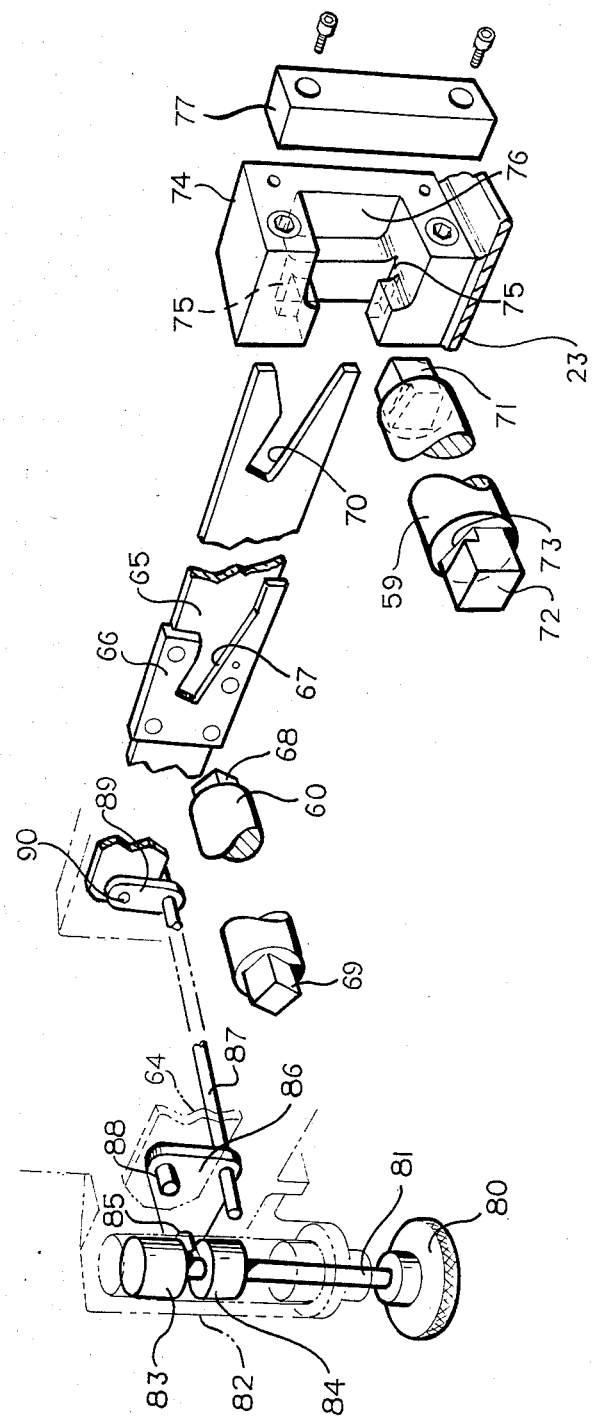
FIG. 7 is an exploded, perspective view of a portion of the blade tension adjusting feature of FIGS. 5 and 6.

With particular reference to FIGS. 5-8, the mechanism by which these two shafts 59 and 60 may be raised and lowered in unison will be described. The carriage 21 is cast with a rear wall 61 to which are bolted a pair of horizontally spaced guideways 62 and 63. The guideway 62 has a generally elongated slot formed therein, within which is positioned the rearward end of a bar 64. A similar bar 65 has its rearward or left end, as viewed in FIG. 5, supported in the guideway 63. The bar 65 has a cam 66 fixed thereto. The cam 66 presents a generally elongated and upwardly angled slot 67 therein. The shaft 60 has a square cam follower end 68 formed thereon, which rides in the cam slot 67. The opposite end of the shaft 60 also is formed with a square end 69, and it is supported in a cam similar to cam 66, which is carried by the bar 64 in facing relationship to the cam 66. Thus it can be seen that moving the bars 64 and 65 to the right, as viewed in FIGS. 5 and 7, will result in the shaft 60 moving vertically upward to raise the horizontal axis of the shaft 60. The forward end of the bar 65 and also the bar 64 have elongated cam slots 70 formed therein, only the one in the bar 65 being visible in detail. The forward shaft 59 is formed at both of its ends with generally square configurations 71 and 72. However, between the rounded portion of the shaft and the square portion 72 there is provided an inclined undercut 73, which will ride in the cam slot 70. The undercut 73, which is formed on the top of the shaft 59, has a similar cut on the bottom such that the undercut portion 73 will fit within the confines of the cam slot 70. It should be noted that the cam slot 70 is at a substantially identical slope as that of the slot end 67 in the cam 66. The square end 71, as shown in FIGS. 7 and 8, is held and guided within a block 74. The block 74 has a pair of vertically opposed slots 75 formed therein, which receive the upper and lower edges of the bar 65. The block 74 furthermore has a rectangular opening 76 formed in the front thereof, and it is within this rectangular cavity 76 that the head 71 or square end of the shaft 59 is positioned. To retain the square end 71 within this rectangular cavity, a cap 77 is bolted on the front of the block 74. The opposite end of the shaft 59 is supported in a block 78 (See FIG. 2), which has a cap 79 bolted thereto. The block 74 is bolted to the boss 28, and a similar boss is provided for anchoring the block 78 at the opposite end of the shaft 59. Thus it can be seen that by movement of the bars 64 and 65, both the shafts 59 and 60 will be raised and lowered in unison to effect the raising and lowering of the shear blade arm 56 to effect a change in the tension applied to the shears. The adjustment or movement of the bars 64 and 65 is carried out by a manually operated knurled wheel 80. The wheel 80 is pinned to a threaded shaft 81 and the shaft 81 threads into the lower end of a vertical cylindrical housing 82. The threaded shaft or adjusting screw 81 has an upper cylindrical barrel portion 83 which is movable within the housing 82. The barrel portion 83 has a cutout about the circumference thereof, within which a pin 85 is positioned. The pin 85 extends out from a generally right angle lever 86. The lever 86 is fixed to and pivots about the axis of a horizontal shaft 87. The lever 86 also carries a pin 88, which extends through a rectangular opening in the bar 64. The shaft 87, at its other end, is supported for pivotal movement about its axis and has a lever 89 fixed thereto, and the lever 89 carries a pin 90 which extends into a hole in the bar 65. Therefore, any movement of the wheel 80 and the shaft 87 will be rotated about its axis, affecting the forward or rearward movement of the bars 64 or 65 to any desired extent.

In addition to the tension adjustment described in detail above, the entire shear mechanism may be raised and lowered as it was explained with respect to the main supporting bracket 12. The shear arm 56 is driven by a rod 91. As previously explained, the rod 54 drives the opposite shear carrying arm 40. The mechanism for effecting the driving of the shear blades is perhaps best seen when viewing FIGS. 1-3, 9 and 10. A drive lever 92, mounted coaxially with respect to the main support shaft 20 and rotatable thereabout, has an arm 93 to which is connected one end of a rod 94. The rod 94, at its other end (not shown), is operated by a rotating cam such that the rod reciprocates lengthwise once each cutting cycle. In actual practice, the rod moves the mechanism to the position shown in FIGS. 1 and 2 where the blades are in their fully open position. Opposition to the movement affected by the rod 94 comes from an elongated spiral spring 95, whose one end is threaded through a generally flat metal connector 96.

The connector 96 is connected by a vertical pin to the drive lever 92. The opposite end of the spring 95 is anchored to a fixed support 98. The support 98 is positioned beneath and adjacent the end of a horizontally extending square tube 99. This rectangular or hollow elongated tube 99 is bolted to the side of the vertical mounting tube portion as shown in FIG. 2. The drive lever 92 is positioned beneath the annular member 24 of the shear carriage 21, and beneath the drive lever 92 is a driven lever 100. The lever 100 rotates also about the axis of the main mounting shaft 20 and also has two outstanding arms which are connected to the ends of the two rods 91 and 54. As perhaps best shown in FIG. 10, the drive lever 92 has a downwardly extending boss 101, which has a generally horizontal slot 102 formed therein. A threaded eye bolt 103, connected to the driven lever 100, has its shank extending into the slot 102. A threaded nut 104 will hold the eye bolt 103 in position in the slot 102 and therefore will hold the driven and driving levers together to operate as an integral unit. As a safety measure in the event the power fails and the cam that drives the reciprocating drive rod 94 ceases to operate, a cylinder 105 mounted on the bar 99 will extend its piston rod 106, to which is fastened a bumper 107, such that the bumper will engage a roller 108 on the lever 92 to effect the movement of the shears to the position shown in FIG. 1 where the shears are open. As can be seen in FIG. 2, the roller 108 is connected to the driven lever 92, to which the shear driving rods 91 and 54 are connected.

In addition to the safety stop arrangement described above, it is also significant and important that the present shear mechanism of the invention be capable of rotation about the axis of the mounting shaft 20 through approximately a 90° angle in a counterclockwise fashion as viewed in FIG. 1, in order to provide access to the shear blades for adjustment or inspection or to change them when necessary. This movement is effected by the operator grasping a handle 109, after a locating pin has been removed, so that the mechanism may be swung about the axis of the main supporting shaft 20. When this movement is to be effected, it is desirable that the drive rod 94 and the drive lever 92 not have their relationship disturbed and, with this in mind, the drive lever 92 may be disengaged from the driven lever 100 by the unthreading of the nut 104 and moving the eye bolt 103 out of the slot 102 formed in the boss 101. A lever 110, pivoted to the boss 101 on an axle pin 111, has an end 112 thereof which is biased to extend into the slot 102 as long as this slot is not occupied by the eye bolt 103. The other end of the lever 110 is in engagement with the side of a latch 114. The latch or stop lever 114 is supported for pivotal movement about a vertical axis on a pin 115. The stop lever 114 is spring-biased in the direction of the end 113 of the lever 110 by a coil spring 116. In the position shown in FIG. 9, where the eye bolt 103 is positioned in the slot 102, the lever 110 will be compressing the spring 116 and the latch 114 will be in the full line position shown. However, when the drive lever and the driven lever are disconnected by removing the eye bolt 103, the latch 114 will be free to pivot to the dotted line position shown in FIG. 9, at which time it may fall within a circumferentially extending slot 117 in the mounting post 20. With the latch 114 free to move in the slot 117, it can be seen that oscillation of the drive lever 92 by the drive cam driven rod 94 will not affect the positioning of the driven lever 100, since they will be disconnected.

Figure 9:
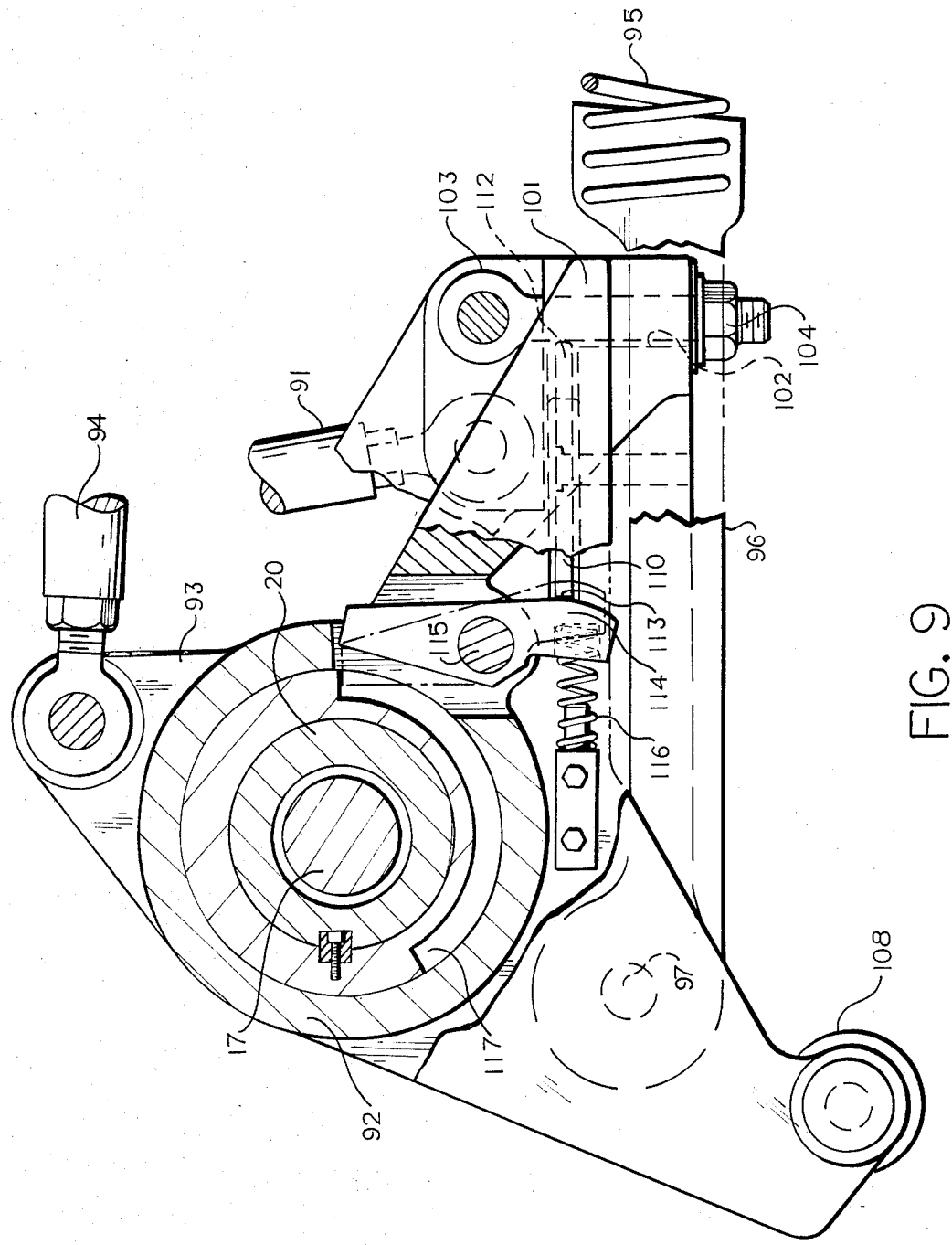
FIG. 9 is a cross-sectional view taken at line 9—9 of FIG. 2, on an enlarged scale.
Figure 10:
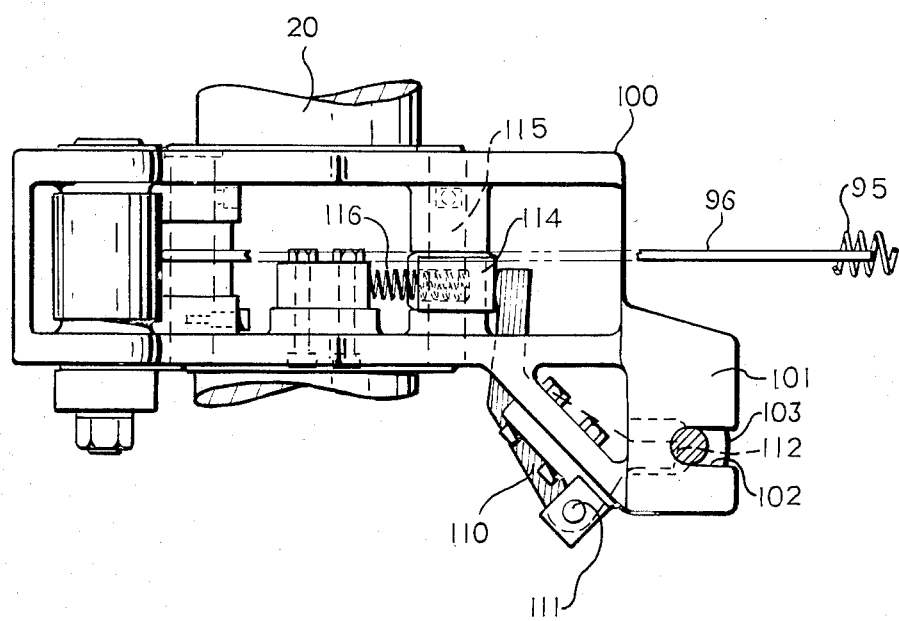
FIG. 10 is a side elevational view, on a reduced scale, of a portion of the pivot mechanism of FIG. 9.

The latch mechanism shown in FIGS. 9 and 10 is a safety feature. When the shear mechanism is rotated counterclockwise through an angle of 90° for the purpose of changing the blades, or some other reason, the lever 92 is held inoperative by the air cylinder 105. After the blade changing has been effected, the operator could rotate the mechanism back under the feeder bowl and take the air pressure off the cylinder 105 without fastening the eye bolt 103. If this happened, the blades would close and not open, resulting in their being quickly covered with molten glass. Note that the eye bolt pulls the blades open. The latch 114, however, engages the vertical surface at the right hand end of the slot 117 (See FIG. 9) if the air pressure is off the air cylinder 105 and the eye bolt 103 is not fastened in place. This then prevents the lever 92 from rotating, and therefore lever 100 cannot rotate and close the blades.

The foregoing detailed description is to provide an understanding of the invention and that one skilled in the glass shearing art will appreciate the scope of the appended claims.

It is claimed:

1. Apparatus for shearing multiple streams of molten glass into gobs, comprising a feeder bowl having a plurality of inline orifices in the bottom thereof, a vertical support shaft, means for mounting said support shaft to the side of said feeder bowl, a shear blade supporting carriage cantilevered from said vertical support shaft, said carriage extending normal to the line of said orifices, at one side thereof, a first pair of parallel, horizontal shafts extending in the direction of said carriage, a first shear blade arm movably supported for reciprocation on said first pair of shafts, a second pair of parallel, horizontal shafts in generally coaxial alignment with said first pair of shafts, a second shear blade arm movably supported for reciprocation on said second pair of shafts, means connected to said second pair of shafts for raising or lowering the axes of said second pair of shafts in unison, and drive means connected to said arms for moving said arms toward and away from each other to affect the shearing of the glass streams.

2. The apparatus of claim 1, further comprising means connected to said vertical shaft for adjusting the height of said vertical shaft relative to the feeder bowl.

3. The apparatus of claim 1, further including drop guide means carried by the first shear blade arm beneath the shear blades carried thereby.

4. The apparatus of claim 3 wherein said drop guide means includes an individual drop guide for each of the shear blades on said first shear blade arm.

5. The apparatus of claim 3 wherein said drop guides are mounted to individual threaded shafts, threaded in the shear blade arm, and further including means to rotate said threaded shafts to adjust the position of the drop guide.

6. The apparatus of claim 5 wherein said shaft rotating means comprises a flat horizontal member connected to the threaded shaft and extending into an elongated slot in a horizontal rotatable shaft.

7. The apparatus of claim 6 wherein said horizontal shaft is mounted in axial alignment with the threaded shaft and means for rotating said horizontal shaft to effect the positioning of said drop guides.

8. The apparatus of claim 1 wherein said means connected to said second pair of shafts for raising or lowering the shafts comprises a horizontal bar adjacent each end of said pair of shafts, cam means carried by said bars engaging said shafts and means connected to said bars for longitudinally moving said bars in equal increments.

9. The apparatus of claim 8 wherein said bars are confined to linear horizontal motion and said second pair of shafts are limited to vertical motion in response to movement of said bars.

10. The apparatus of claim 8 wherein said means connected to said bars for longitudinally moving said bars comprises a horizontal rock shaft, a pair of radial levers connected to said rock shaft with their opposite ends connected to one of said bars, and means connected to said rock shaft for rotating said rock shaft about its horizontal axis.

11. The apparatus of claim 10 wherein said means for rotating said rock shaft comprises a vertically extending threaded shaft drivingly connected to one of said levers, and means for rotating said threaded shaft.

12. The apparatus of claim 1, further including a drive lever supported for rotation about said vertical support shaft, a drive rod connected to said drive lever and spring means connected to said drive lever for providing the power to cut the glass, a driven lever mounted for rotation on said vertical support shaft, a rod extending from each of diametrically opposed arms of said driven lever to the shear blade arms and means coupling said drive lever and driven lever together to operate in unison.

13. The apparatus of claim 12 wherein said coupling means comprises a quick-disconnect, threaded eye bolt fastened to the driven lever and a bolt receiving boss carried by the drive lever, with means for loosening the eye bolt from the slot.

* * * * *

UNITED STATES PATENT AND TRADEMARK OFFICE
CERTIFICATE OF CORRECTION

PATENT NO. : 4,499,806

DATED : February 19, 1985

INVENTOR(S) : Eustace H. Mumford

It is certified that error appears in the above-identified patent and that said Letters Patent is hereby corrected as shown below:

Page 1 of 2

The title page, should be deleted to appear as per attached title page.

Signed and Sealed this

Ninth Day of July 1985

[SEAL]

Attest:

DONALD J. QUIGG

Attesting Officer

Acting Commissioner of Patents and Trademarks

United States Patent [19]

Mumford

[11] Patent Number: 4,499,806
[45] Date of Patent: Feb. 19, 1985

[54] MULTIPLE GOB SHEARING MECHANISM OPERATING IN A STRAIGHT LINE

[75] Inventor: Eustace H. Mumford, Ottawa Lake, Mich.

[73] Assignee: Owens-Illinois, Inc., Toledo, Ohio

[21] Appl. No.: 541,815

[22] Filed: Oct. 13, 1983

[51] Int. Cl.³ .............................................. C03B 5/38
[52] U.S. Cl. ..................................... 83/527; 83/563; 83/564; 83/623; 83/641; 83/58; 83/DIG. 1; 65/334
[58] Field of Search ................. 83/527, 623, 640, 641, 83/700, 563, 564, 58, DIG. 1; 65/133, 332, 334

[56] References Cited
U.S. PATENT DOCUMENTS 3,592,938  7/1971  Bracken et al. ................... 65/133 X
4,174,647  11/1979  Dahms ............................. 83/522 X Primary Examiner—James M. Meister
Attorney, Agent, or Firm—Gerald T. Welch; Myron E. Click

[57] ABSTRACT

A multiple gob glass shearing mechanism in which the sets of opposed shear blades are supported for movement toward and away from each other in a straight line or with parallel motion. One set of shears is mounted on a shear guide that can be adjusted up or down relative to the holder of the opposed set of shears. This adjustment is for the purpose of adjusting the tension on all the sets of blades simultaneously and can be affected when the shears are in operation. The drive for the shears may be unlatched for safety purposes when out of position and when put back into operation the shear blades will not close unless the latch is refastened.

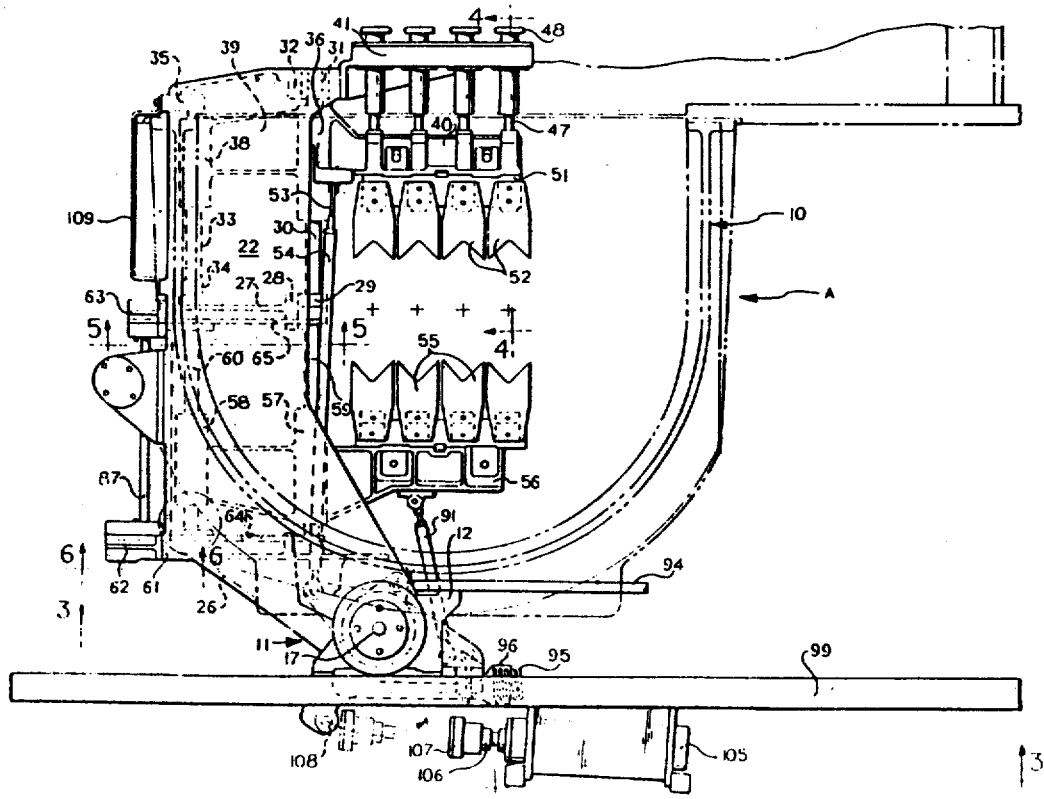

13 Claims, 10 Drawing Figures